United States Patent
Joseph et al.

(10) Patent No.: US 12,415,304 B2
(45) Date of Patent: *Sep. 16, 2025

(54) AIR RING FOR BLOWN-FILM EXTRUSION APPARATUS

(71) Applicant: Daniel R. Joseph, Arlington, TX (US)

(72) Inventors: Daniel R. Joseph, Arlington, TX (US); Joshua S. Powell, Arlington, TX (US); Adrian M. Hawk, Fort Worth, TX (US)

(73) Assignee: Daniel R. Joseph, Arlington, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/461,619

(22) Filed: Sep. 6, 2023

(65) Prior Publication Data

US 2024/0017460 A1    Jan. 18, 2024

Related U.S. Application Data

(63) Continuation of application No. 17/851,436, filed on Jun. 28, 2022, now Pat. No. 11,826,941.

(51) Int. Cl.
*B29C 48/10*     (2019.01)
*B29C 48/00*     (2019.01)
(Continued)

(52) U.S. Cl.
CPC .......... *B29C 48/10* (2019.02); *B29C 48/0018* (2019.02); *B29C 48/251* (2019.02);
(Continued)

(58) Field of Classification Search
CPC ... B29C 48/10; B29C 48/0018; B29C 48/251; B29C 48/256; B29C 48/27;
(Continued)

(56) References Cited

U.S. PATENT DOCUMENTS 3,618,169 A    11/1971   Coast
4,139,338 A    2/1979    Cole
(Continued)

FOREIGN PATENT DOCUMENTS

| CA | 3077704 A1 | 9/2021 |
|---|---|---|
| DE | 6916838 U | 8/1969 |
| WO | 2020049459 A1 | 3/2020 |

OTHER PUBLICATIONS

European Patent Office, Extended European Search Report App. No. 22207561.6, May 15, 2023.

*Primary Examiner* — Jeffrey M Wollschlager
(74) *Attorney, Agent, or Firm* — Mark D. Perdue

(57) ABSTRACT

An air ring has a main body including a plenum through which pressurized air enters the air ring, the main body including a generally circular interior that is unobstructed vertically above the main body. A generally circular forming-cone assembly is received in the generally circular interior of the main body, and includes at least one annular lip defining a passage through which pressurized air from the plenum exits the air ring for impingement upon the polymer tube. A plurality of fasteners secure the forming-cone assembly in the interior of the main body, the fasteners and forming-cone assembly being unobstructed vertically above the air ring, wherein the fasteners are accessible from vertically above the air ring and the forming-cone assembly is removable from the main body by vertical lifting without removal of other components from the air ring.

23 Claims, 6 Drawing Sheets

(51) Int. Cl.
*B29C 48/25* (2019.01)
*B29C 48/27* (2019.01)
*B29C 48/32* (2019.01)
*B29C 48/88* (2019.01)
*B29C 48/885* (2019.01)
*B29C 48/90* (2019.01)

(52) U.S. Cl.
CPC ............ *B29C 48/256* (2019.02); *B29C 48/27* (2019.02); *B29C 48/272* (2019.02); *B29C 48/32* (2019.02); *B29C 48/885* (2019.02); *B29C 48/903* (2019.02); *B29C 48/912* (2019.02)

(58) Field of Classification Search
CPC ..... B29C 48/272; B29C 48/32; B29C 48/885; B29C 48/903; B29C 48/912
See application file for complete search history.

(56) References Cited

U.S. PATENT DOCUMENTS

| | | |
|---|---|---|
| 4,209,475 A | 6/1980 | Herrington et al. |
| 4,259,047 A | 3/1981 | Cole |
| 4,408,970 A | 10/1983 | Bustin et al. |
| 4,443,400 A | 4/1984 | John |
| 4,478,564 A | 10/1984 | Shinmoto |
| 4,632,801 A | 12/1986 | Dowd |
| 4,750,874 A | 6/1988 | Keim |
| 4,826,414 A | 5/1989 | Planeta |
| 5,281,375 A | 1/1994 | Konermann |
| 5,288,219 A | 2/1994 | Smith |
| 5,464,336 A | 11/1995 | Planeta |
| 5,468,134 A | 11/1995 | Cree |
| 5,676,893 A | 10/1997 | Cree |
| 5,804,221 A | 9/1998 | Planeta et al. |
| 6,068,462 A | 5/2000 | Wybenga |
| 6,739,855 B2 | 5/2004 | Randolph et al. |
| 6,783,344 B1 | 8/2004 | Rudolf |
| 7,314,592 B2 | 1/2008 | Randolph et al. |
| 7,654,808 B2 | 2/2010 | Mirek et al. |
| 7,806,674 B2 | 10/2010 | Joppe et al. |
| 8,956,136 B2 | 2/2015 | Zimmermann |
| 9,017,053 B2 | 4/2015 | Rübbelke |
| 9,327,440 B2 | 5/2016 | Joppe et al. |
| 9,409,340 B2 | 8/2016 | Bertrand |
| 9,457,526 B2 | 10/2016 | Zimmermann et al. |
| 9,810,488 B2 | 11/2017 | Rübbelke et al. |
| 10,232,543 B2 | 3/2019 | Shimizu et al. |
| 11,298,865 B2 | 4/2022 | Cree et al. |
| 11,618,200 B2 | 4/2023 | Bucko et al. |
| 2002/0004081 A1 | 1/2002 | Raiko et al. |
| 2002/0018822 A1 | 2/2002 | Krycki |
| 2002/0130431 A1 | 9/2002 | Randolph et al. |
| 2006/0099291 A1 | 5/2006 | Planeta et al. |
| 2008/0061460 A1 | 3/2008 | Zimmermann et al. |
| 2008/0258325 A1 | 10/2008 | Zimmermann |
| 2009/0252819 A1 | 10/2009 | Joppe et al. |
| 2012/0200001 A1 | 8/2012 | Joppe et al. |
| 2014/0057010 A1 | 2/2014 | Ruebbelke et al. |
| 2016/0250792 A1 | 9/2016 | Caccia et al. |
| 2016/0250794 A1 | 9/2016 | Parker |
| 2017/0015043 A1 | 1/2017 | Shimizu et al. |
| 2018/0126616 A1 | 5/2018 | Ponsiani et al. |
| 2018/0361647 A1 | 12/2018 | Nakano |
| 2019/0358884 A1 | 11/2019 | Zimmermann et al. |
| 2020/0016815 A1 | 1/2020 | Brink et al. |
| 2021/0162644 A1 | 6/2021 | Nappa et al. |
| 2021/0291426 A1 | 9/2021 | Bucko et al. |

AIR RING FOR BLOWN-FILM EXTRUSION APPARATUS

BACKGROUND OF THE INVENTION

1. Field of the Invention

The invention relates generally to blown-film extrusion apparatus. More particularly, the invention relates to the external cooling or air rings used to cool blown film in such apparatus.

2. Background of the Invention

Blown-film extrusion is the dominant method of producing polymer or plastic tubes and sheeting. Polymer material is melted into a viscous liquid and then is extruded through an annular die. Air is injected through a hole in the center of the die, and the pressure causes the extruded melt to expand into a conical tube shape. An external cooling device in the form of an annular ring or "air ring" creates at least one venturi zone to lock the tube to a mechanical forming-cone designed to maintain the conical tube shape as the material transitions to a constant diameter tube.

External cooling rings for blown film extrusion come in a variety of configurations including traditional single lip, traditional dual lip, elevated dual lip, and elevated triple lip. "Lips" are, generally speaking, portions of the device where air exits the ring and impinges on the exterior of the polymer tube. They are usually annular and may be considered "venturi generators." In each of these cases, the lips and related bubble-diameter components are secured to the air ring main body with traditional fasteners (screws, bolts, washers and nuts). Regardless of the configuration, the bubble-diameter portions of the air ring have securing fasteners underneath the air ring which can only be accessed by lifting the air ring off the blown film extrusion die.

Air rings can weigh from 100 to several thousand pounds depending on the overall diameter, so lifting the air ring requires either a lifting device mounted above the air ring or a mobile lifting device, which often requires removal of personnel-support structure (installed for operator access to the blown film die and external cooling ring during startup) prior to the air ring lifting process. Therefore, if the bubble-diameter dependent components of the air ring require cleaning, repair or replacement, it requires a significant portion of manpower and time. It is not uncommon for a lower lip replacement to take hours or even an entire day depending on a variety of factors, but mainly, the overall size of the air ring.

External cooling rings also have one or two different levels of cooling operation. The first is general cooling of the entire exterior diameter of the extruded tube and the second is "tactical" or location-specific cooling and or heating of specific portions of the exterior of the extruded tube to produce a highly uniform thickness of the extruded tube. In both cases, there are narrow air flow annuluses which can accumulate oils, paraffins, melted plastic, and lubrication grease in a non-uniform manner. Regardless of the level of cooling operation (general or tactical), these accumulations can adversely affect the overall cooling process and cause local bubble instabilities which lead to unacceptable film thickness variation. In addition, there may be a large venturi-generating surface which, if damaged (ironically this happens most often during cleaning) or has plastic accumulations, will adversely affect the air ring cooling performance and create unwanted thickness variations in the extruded tube.

For instance, producing an extruded tube just slightly larger in diameter to the blown film extrusion die exit annulus is called a "low blow-up ratio" configuration. This is the most difficult configuration to run in terms of air ring cooling and requires an air ring specifically configured for the operation. Many customers either purchase two air rings, one for traditional diameter tubes and one for low blow-up ratio tube diameters or they take the time to remove the air ring and install new components, which can take hours or days depending on the size of the air ring.

Further, because even small air rings have fairly heavy bubble-diameter components, reducing the overall weight is desirable to avoid operator lifting injuries and to reduce strain on lifting devices, which may include a bubble cage with limited lifting capacity.

A need exists, therefore, for air ring designs that simplify and expedite the process of disassembly of air rings for changing and/or cleaning of lips and related bubble-diameter components.

SUMMARY OF THE INVENTION

It is a general object of the present invention to provide an improved air ring for use in blown-film extrusion apparatus.

This and other objects of the invention are attained by providing an air ring comprising a main body including a plenum through which pressurized air enters the air ring, the main body including a generally circular interior that is unobstructed vertically above the main body. A generally circular forming-cone assembly may be received in the generally circular interior of the main body, the forming-cone assembly including at least one annular lip defining a passage through which pressurized air from the plenum exits the air ring for impingement upon the polymer tube. A plurality of fasteners secure the forming-cone assembly in the interior of the main body, the fasteners and forming-cone assembly being unobstructed vertically above the air ring, wherein the fasteners are accessible from vertically above the air ring and the forming-cone assembly is removable from the main body by vertical lifting without removal of other components from the air ring.

According to one embodiment of the present invention, a plurality of keys may be arranged about a circumference of one of the main body interior and the forming-cone assembly; and a plurality of keyways arranged about the circumference of another of the main body interior and the forming-cone assembly, wherein upon securing the forming-cone assembly in the interior, the keys and keyways register and locate the forming-cone assembly relative to the main body.

According to another embodiment of the present invention, the forming-cone assembly comprises a second annular lip; and a supplementary lip.

According to still another embodiment of the present invention, the fasteners are tool-less and arranged to secure the keys in the keyways.

According to yet another embodiment of the present invention, selected portions of the forming-cone assembly are formed of composite polymeric material.

According to another embodiment of the present invention, at least one selected portion of the forming-cone assembly is color-coded to correspond with a functional characteristic of the selected portion of the forming-cone assembly.

According to yet another embodiment of the present invention, the main body interior has a plurality of diametral dimensions and the forming-cone assembly has a plurality of external diametral dimensions; and, except where the main body interior and forming-cone assembly mate together, the diametral dimensions of the main body interior are greater than or equal to the diametral dimensions of the forming-cone assembly.

Other features, aspects, and objects of the present invention will become apparent to those skilled in the art with reference to the figures and the detailed description of the invention, which follows.

DETAILED DESCRIPTION OF THE INVENTION

Figure 1:
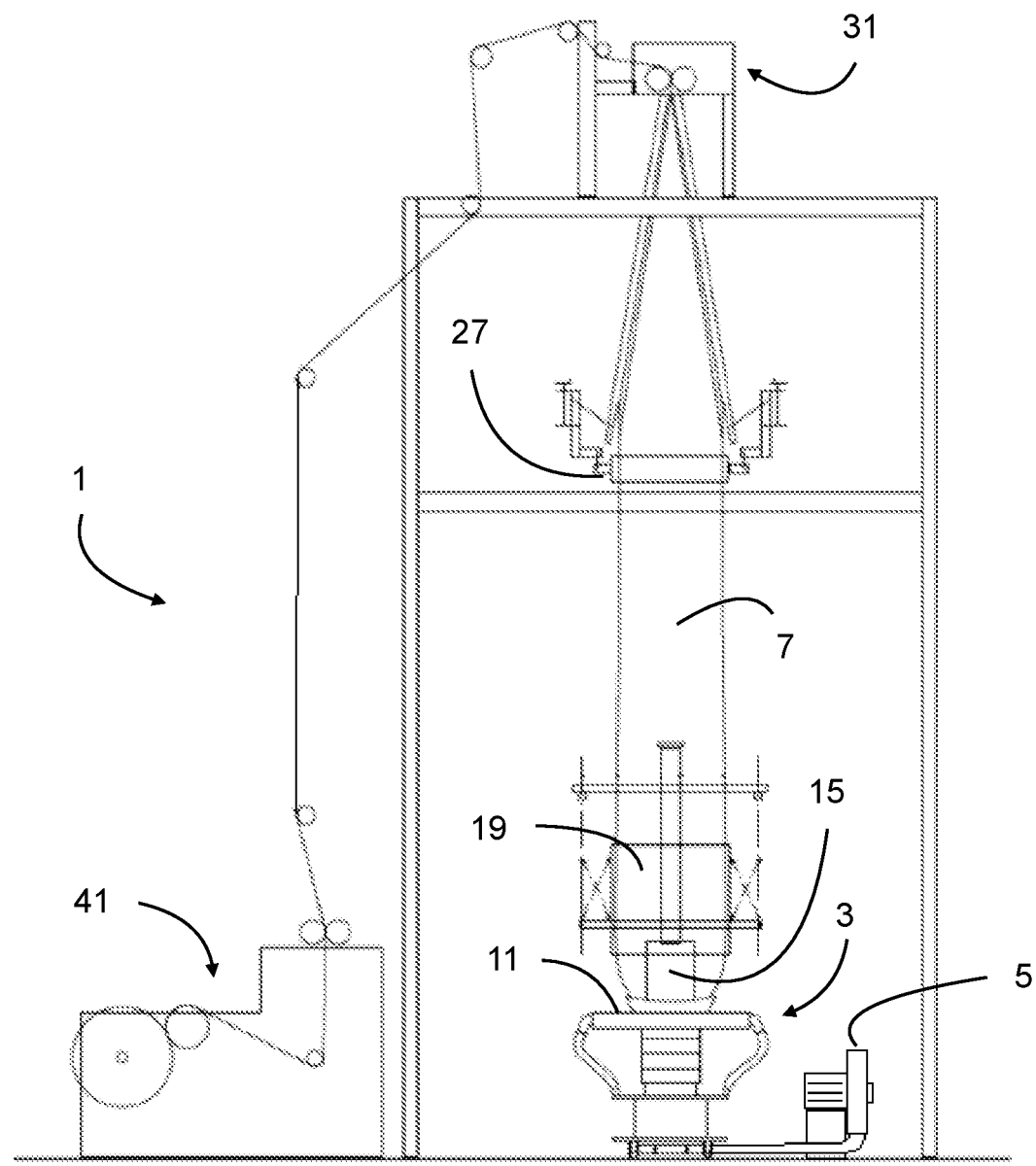
FIG. 1 is an elevation view of a blown-film extrusion apparatus of the type with which the present invention is contemplated.

Turning now to the Figures and in particular to FIG. 1, a blown-film extrusion apparatus 1, as previously described and as adapted for use with the present invention is illustrated. As previously described, an extrusion die 3 and blower 5 extrude a polymer tube or bubble 7 that extends vertically upward. Die 3 includes an air ring or external cooling device 11 as well as an internal cooling device 15 and a bubble sizing cage 19.

Above bubble-sizing cage 19, a collapsing frame 27 assists in collapsing the cylindrical tube 7 into a flattened tube, where it enters a nip roller assembly 31. A fully flattened tube 7 emerges from the nip roller assembly 31, moves over a series of idler rollers to a windup assembly 41, where the final film product is wound onto a roll. An electronic controller (not shown) may receive data inputs and measurements from a plurality of sensors that may include tube-diameter sensors located above bubble-sizing cage 19, a flat-width measurement bar between nip rollers 31 and windup assembly 41, a width controller associated with die 3, and various other components of the system to control various process parameters. FIG. 1 illustrates a vertically upwardly oriented extrusion apparatus or system, but the present invention has utility in vertically downwardly oriented and horizontally oriented systems, as well. Therefore, references to "vertical," "vertically," "vertically upward," "upper," and "lower" in this description are relative and not intended to limit the invention to vertically and upwardly oriented apparatus.

Figure 2:
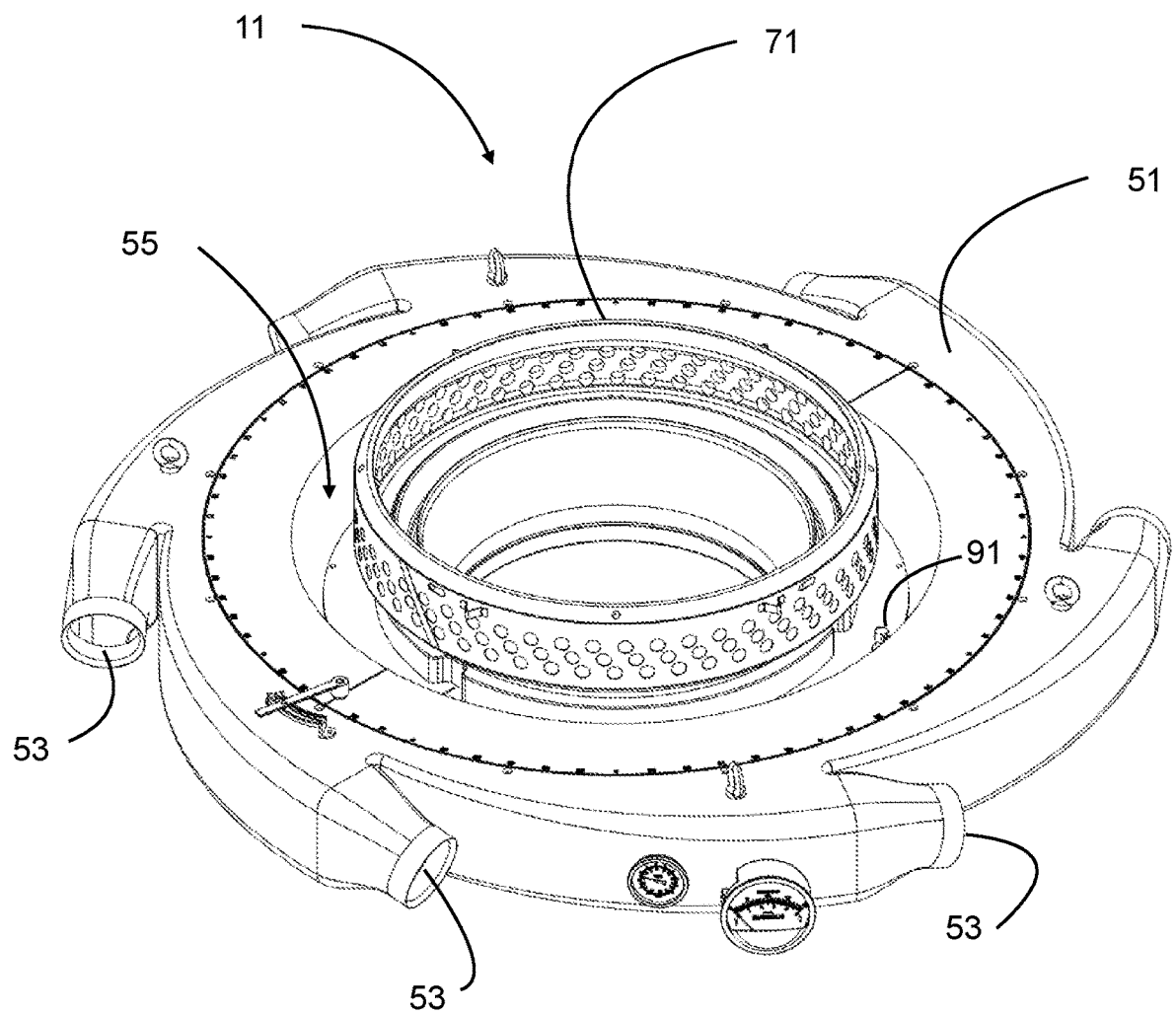
FIG. 2 is an external perspective view of an air ring according to a preferred embodiment of the invention.
Figure 3:
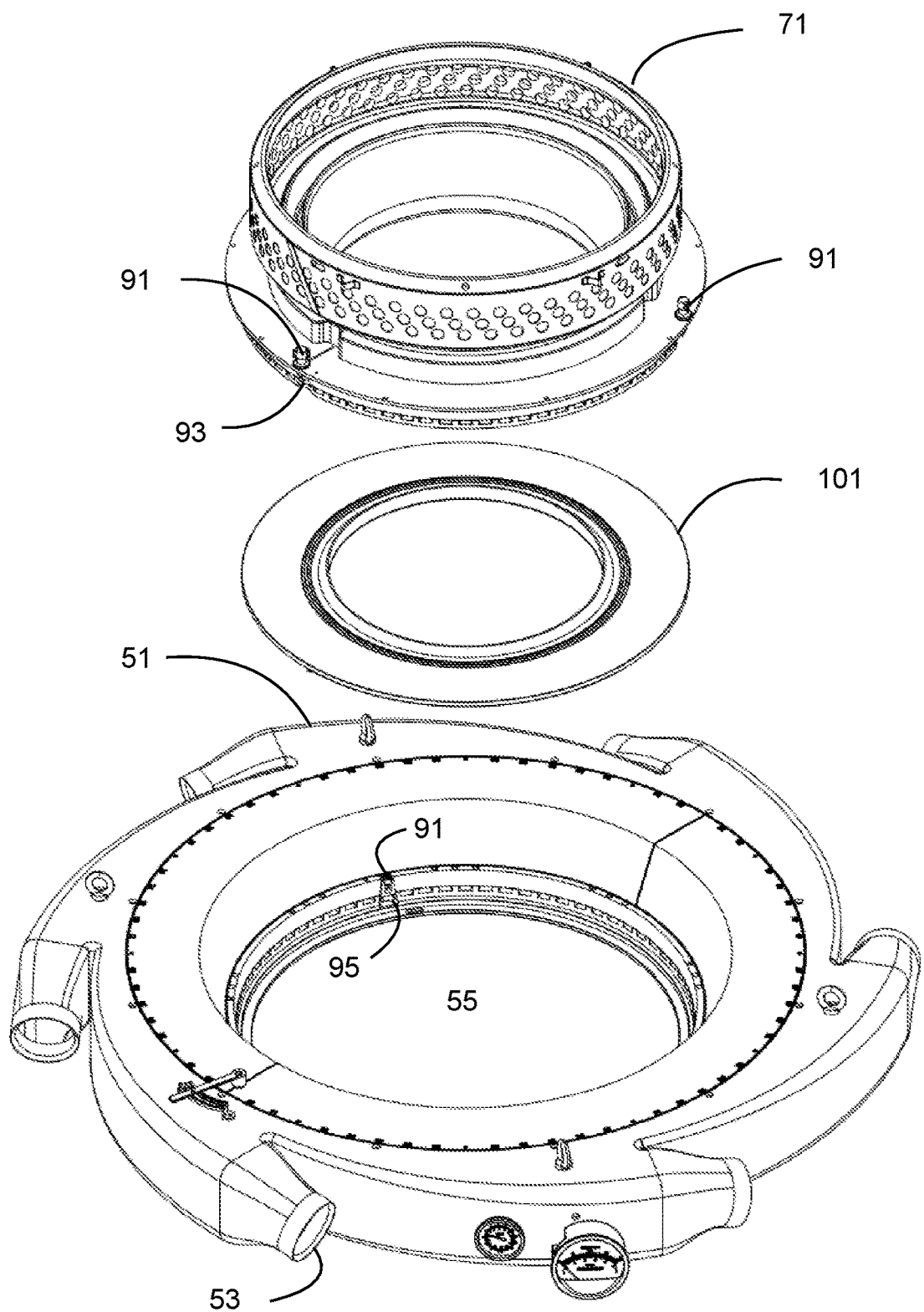
FIG. 3 is an exploded external perspective view of the air ring of FIG. 2.

FIGS. 2 and 3 depict an external cooling device or air ring 11 in accordance with a preferred embodiment of the invention, in assembled and exploded views, respectively. Air ring 11 may comprise two basic components, a main body 51, and a forming-cone assembly 71, each of which is generally circular or toroidal in configuration. Main body 51 may include one or more air inlets 53, which may be distributed circumferentially about its exterior diameter, which may be connected to a blower (5 in FIG. 1) to admit pressurized air to a plenum inside main body 51. Main body 51 may also include a generally circular interior 55.

Forming-cone assembly 71 may be assembled into and located within interior 55 of main body 51 and is in fluid communication with the pressurized air within the plenum of main body 51, as described in greater detail below. Forming-cone assembly 71 includes the lips, or venturi-generating devices or venturi generators, the supplementary lip or venturi-constraining device, and related and other bubble-diameter components that are responsible for cooling air impinging on the polymer tube or bubble (7 in FIG. 1) as it passes through forming-cone assembly 71. These bubble-diameter components are described in greater detail with reference to FIG. 4. A lower lip 101 is also disposed and located within circular interior 55 of main body 51 at its lowermost extent. Upon assembly, lower lip 101 mates with the lowermost surface of forming-cone assembly to form the lower lip or venturi generator (as described in greater detail in FIG. 4).

As shown in FIG. 3, interior 55 of main body 51 is unobstructed "vertically" or axially and permits forming-cone assembly 71 (and lower lip 101) to be moved freely in (vertically downwardly) and out (vertically upwardly) of interior 55 without disassembly of either main body 55 or forming-cone assembly 71. Stated another way, the smallest diametral dimension of any portion of the inner diameter of interior 55 of main body 51 is equal to or larger than the largest diametral dimension of any portion of the exterior diameter of forming-cone assembly 71, except in selected locations where main body 51 and forming-cone assembly 71 mate together and are fastened or secured together, preferably at the lower or middle portions of interior 55, so that the upper portions remain unobstructed (see FIGS. 4 and 5).

A plurality of fasteners 91 (four in this illustrative embodiment, three of which are obscured from view) may be arranged about the circumference of an outermost portion or flange of forming-cone assembly 71. To maximize the simplicity of disassembly of forming-cone assembly 71 from main body 51, fasteners 91 may preferably be tool-less, requiring no additional tools or implements to engage and disengage.

A tapered keyway or slot 93 may be formed below each fastener 91. A corresponding or mating tapered key or projection 95 may be formed on the inner surface of interior 55 of main body 51 at locations corresponding to the locations of keyways 93 on forming-cone assembly 71. Upon assembly together, keys 95 and keyways 93 register with one another and assist in locating forming-cone assembly 71 within and relative to main body 51. Keys 95 provide a boss or heavier section where fasteners 91 may engage. The tapered configuration of keys 95 and keyways 93 eases their registry together. Fasteners 91 may be used to releasably secure forming-cone assembly 71 within interior 55 of main body 51. The arrangement of fasteners 91, keys 95, and keyways 93 is described in greater detail in connection with FIG. 5. Keys 95 and keyways 93 also provide a "cleaning configuration" described in greater detail with reference to FIG. 6.

Figure 4:
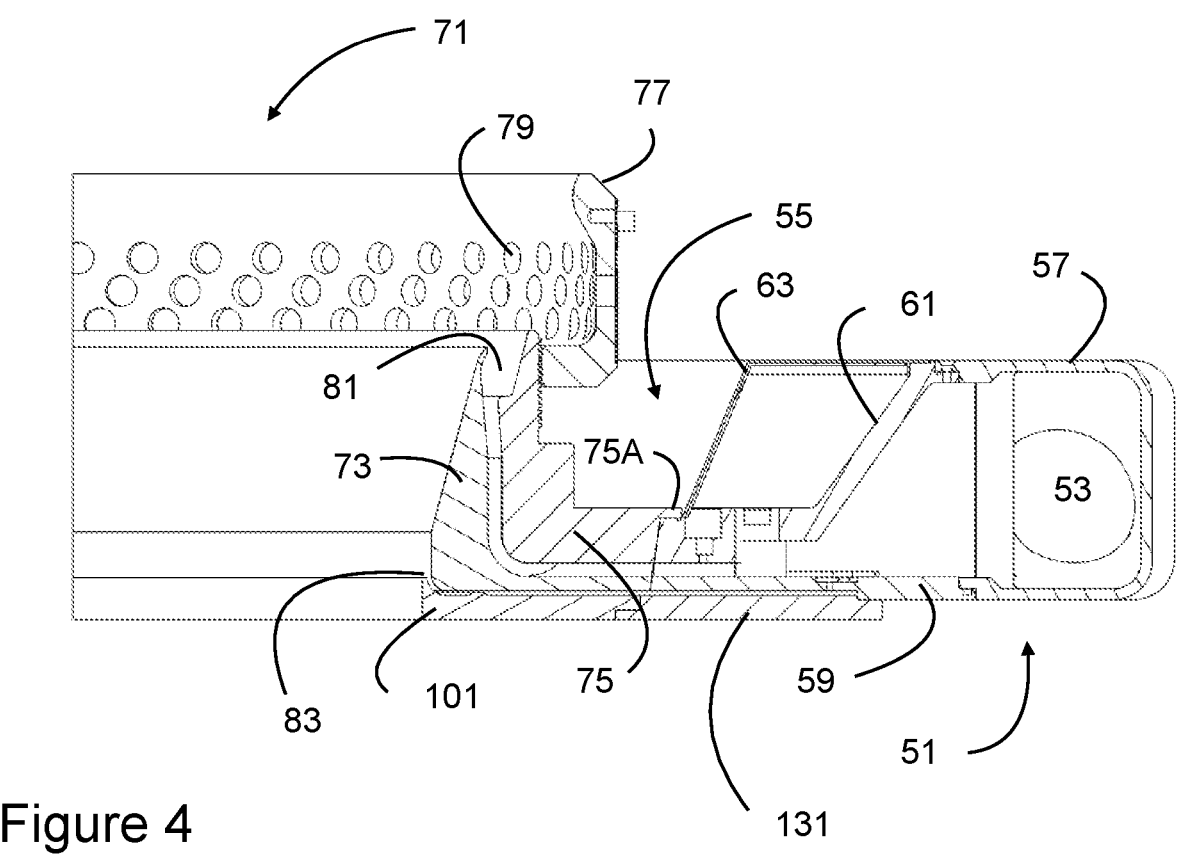
FIG. 4 is a fragmentary section view of a portion of the air ring of FIGS. 2 and 3.

FIG. 4 is a section view of forming-cone assembly 71 and main body 51 assembled together and illustrating their respective components. Main body 51 may comprise an outer plenum 57 connected to a bottom plenum 59 and a top plenum 61. These components combine to define a plenum through which pressurized air entering from inlets 53 is directed to the lips or venturi-generating and venturi-maintaining components of forming-cone assembly 71. A cover 63 may be provided over top plenum 61. Main body 51 rests atop a base 131.

Forming-cone assembly 71 may comprise a middle lip 73, an upper lip 75, and a supplementary lip 77, which are all secured together and removable as a unit. It can be seen in FIG. 4 that the smallest diameter portion of interior 55 of main body 51 is equal to or larger than the largest outer diameter of any portion of forming-cone assembly 71, with the exception of flange 75A on upper lip 75, which mates and engages with a corresponding horizontal surface on top plenum 61 and through which fasteners 91 extend to secure forming-cone assembly 71 within main body 51.

In this particular embodiment, lower lip 101 is separate from forming-cone assembly 71 and is connected directly to base 131 and is removable separately from forming-cone assembly 71. Lower lip 101, or a similar structure, may also be formed as part of forming-cone assembly 71, in which case it would be removable along with its other components as a unit. Again, FIG. 4 illustrates that the outer diametral dimensions of the various components of forming-cone assembly 71 are smaller than the inner diametral dimensions of main body 51, except where the two mate together, thus avoiding obstruction or interference between forming-cone assembly 71 and main body 51 and permitting the easy removal of forming-cone assembly from interior 55 of main body 51.

Air passages, also sometimes referred to as "lips," may be formed or defined between or by components of forming-cone assembly. An upper air passage or lip 81 is defined between upper 75 and middle 73 lips. A lower air passage or lip 83 is defined between lower 101 and middle 73 lips. Air from the plenum of main body 51 flows through passages 81, 83 and impinges on the exterior of polymer tube or bubble 7 (FIG. 1) as it rises through the interior of forming-cone assembly 71, thus cooling the tube or bubble and controlling its dimensions. Passages 81, 83 may be continuous about the circumference of forming-cone assembly 71, or may be radially divided into channels to deliver air at specific locations on the exterior of bubble or tube 7. Industry use of the term "lip" can be confusing. The term is used to refer both to the structural components that define air passages and to the passages themselves. The passages can also be referred to as "venturi generators" or "venturi-generating devices."

Further, a supplementary lip 77, including a plurality of perforations 79, may be secured to upper lip 75. Supplementary lip 77 permits the controlled exit of air, through perforations 79, from the annulus between the bubble or tube 7 and the interior of forming-cone assembly 71. Unlike lower 101, middle 73, and upper 75 lips, which define air entry passages, supplementary lip 77 defines air exit passages and may be considered a "venturi constrainer" or "venturi-constraining device." More broadly, the components of forming-cone assembly 77 that define various air passages may be considered and referred to as "bubble-diameter components." Although two air entry passages and the associated lower 101, middle 73, and upper 75 lips, and one air exit passage and associated supplementary lip 77 are illustrated in the preferred and illustrative embodiment, the teachings of the present invention may be adapted to any combination of bubble-diameter components and associated venturi generators and venturi maintainers, that is, having more or fewer lips and air passages and of differing configurations.

Conventionally, bubble-diameter components are fabricated from stainless steel and aluminum, because weight is not typically a paramount consideration. With the present invention, however, weight reductions are an important consideration to ease and simplify the disassembly of the air ring. Weight reductions can be achieved by forming those components not exposed to high temperatures and heat of composite materials such as polymers and fiber-reinforced polymers, such as carbon fiber. For example, supplementary lip 77 is generally not exposed to heat and is large and heavy when made of metallic materials. Substantial weight savings may be obtained by forming it of a polymer or composite material. Similarly, upper lip 75 is insulated from heat and may be formed of polymer or composite material. Generally, the "lower" the structure is in the air ring 11 (toward where the tube or bubble 7 enters the ring), the higher the temperature and the less likely a part can be made of polymer or composite material, so middle lip 73 and lower lip 101 may not be feasibly made of such materials, depending on process parameters.

Use of these materials also permits them to be colored and "color-coded" more effectively than metallic parts, thus simplifying the replacement of bubble-diameter components. For example, two "supplementary lips" (77 in FIGS. 2 though 4) having different sized perforations and flow characteristics may be distinguished from one another readily by their color, avoiding mistakes. Alternatively, groups of bubble diameter components associated with a particular configuration, such as the low blow-up configuration, may be made of a single color or combination of colors.

Figure 5:
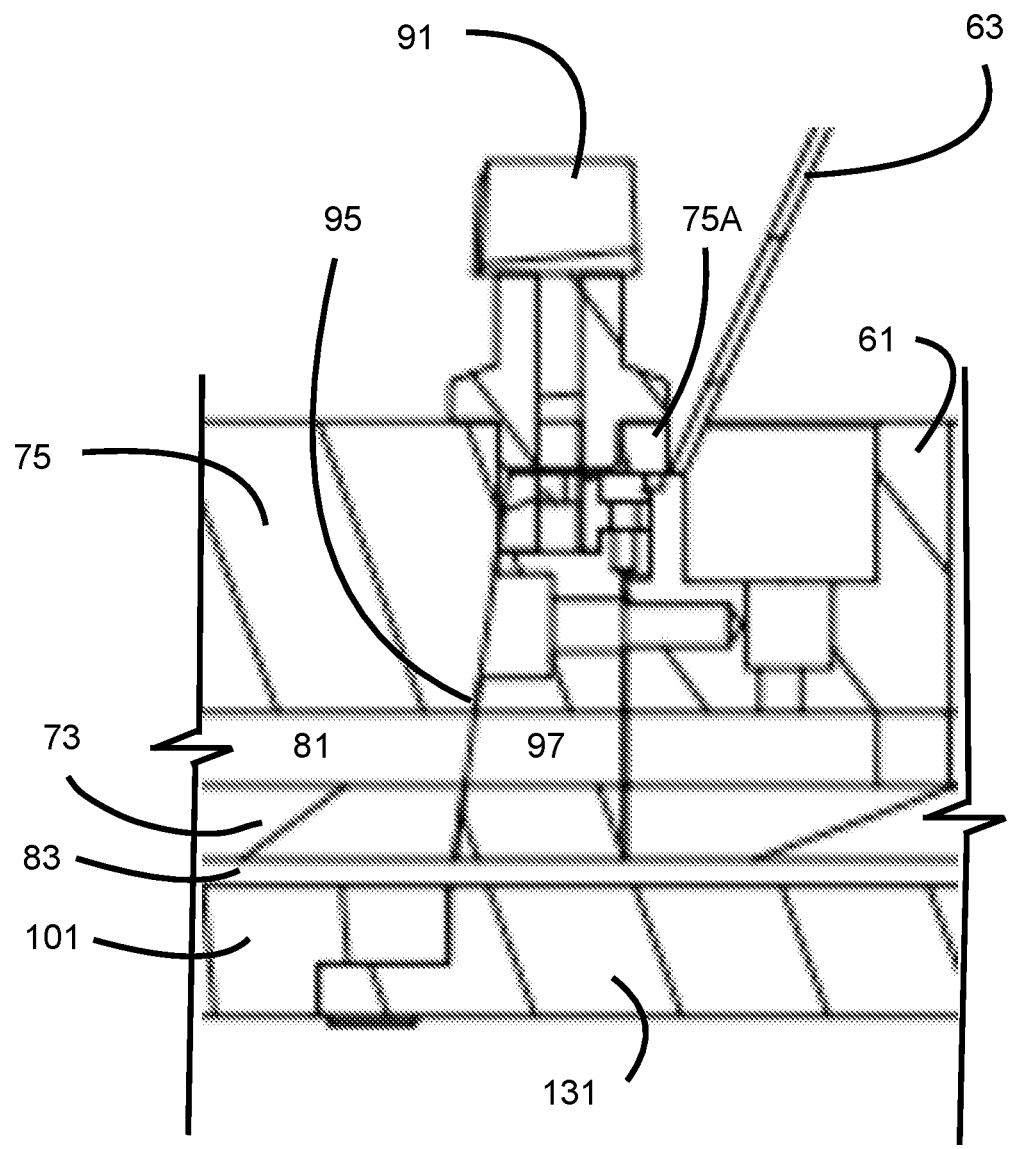
FIG. 5 is an enlarged, fragmentary section view of a portion of the air ring of FIGS. 2 and 3.

FIG. 5 is an enlarged fragmentary section view similar to FIG. 4, except the section is taken through a portion of air ring 11 including fastener 91 and key 95 and keyway 93. As illustrated, fastener 91 may project above upper lip 75, specifically flange 75A into the unobstructed open space above forming-cone assembly 71 and cover 63 of main body 51. Fastener 91 thus is accessible, operable, and visible from above air ring 11. A preferred fastener is the model K1558.1516 quarter-turn clamp lock (all stainless steel) made and sold by HEINRICH KIPP WERK GmbH & Co. KG, Heubergstrage 2, 72172 Sulz am Neckar, Germany. The primary function of fasteners 91 (securing together forming-cone assembly 71 and main body 51) can be provided by any number of fastener types or designs, of either the tool-less or non-tool-less types, e.g. quarter-turn screw, thumb screw, keyed lock, toggle clamp, driven inverse wedge, quarter-turn latch. The preferred quarter-turn latch facilitates tool-less operation, provides a visual indication of the position of the fastener (secure or unsecure), and minimizes the space requirements.

A shaft portion of fastener 91 extends through flange 75A into a bore in key 95, which provides a boss or heavy section for receiving that portion of fastener 91. Key 95 is secured by a bolt or similar fastener to top plenum 61 of main body 51. Key 95 may be provided with a passage 97 that aligns or registers with upper cooling air passage 81. Alternatively, key 95 may be dimensioned or arranged to avoid obstructing such passages.

Figure 6:
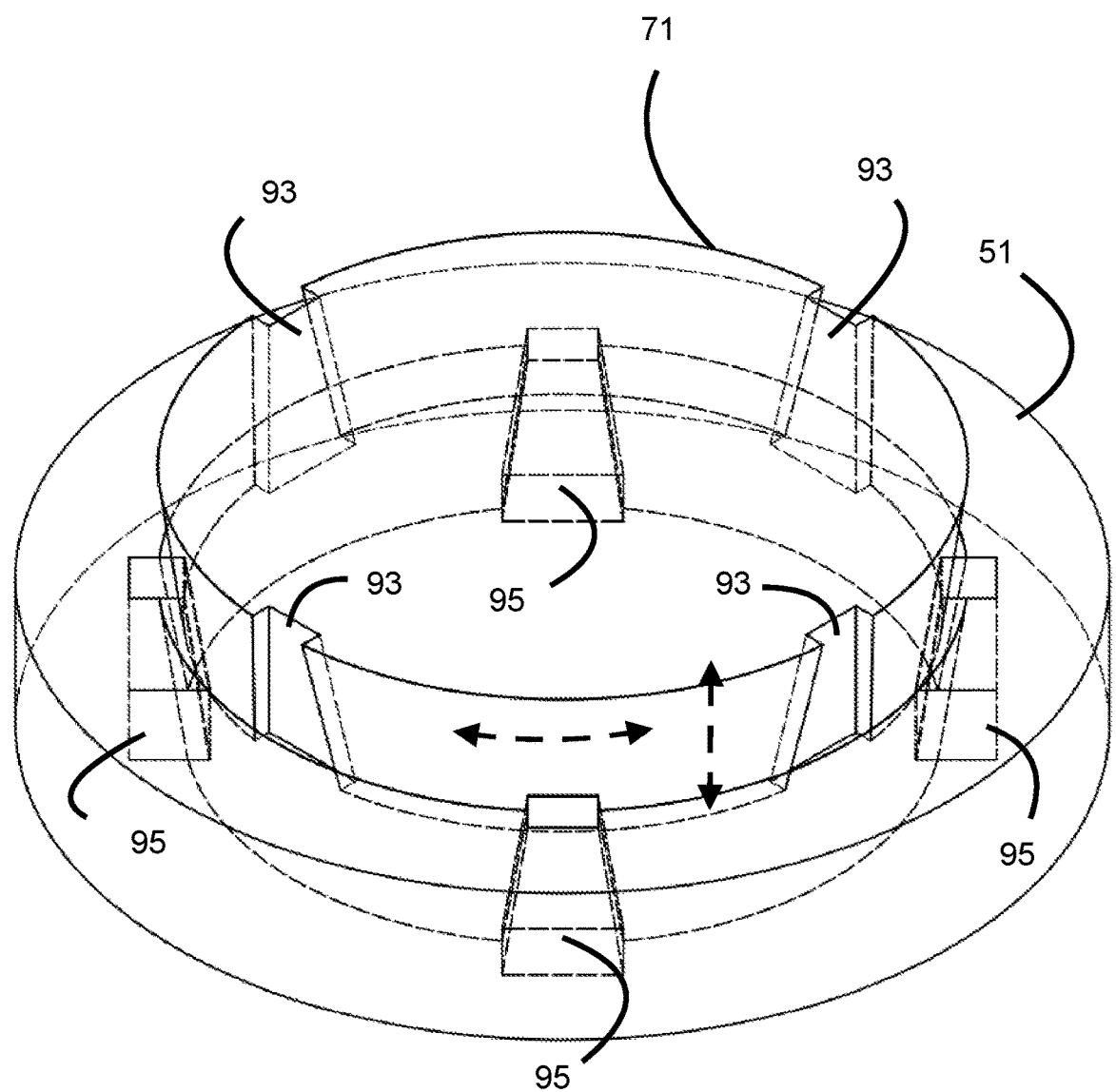
FIG. 6 is a schematic depiction of the cleaning mode or configuration in accordance with an aspect of the present invention.

FIG. 6 is a schematic depiction of a cleaning mode or configuration made possible by the use of keys 95 and keyways 93. In this illustration, details of main body 51 and forming-cone assembly 71 are omitted for ease of visualization. In the cleaning mode or configuration, forming-cone assembly 71 may be raised just sufficiently to disengage or "unregister" keys 95 on main body 51 and keyways 93 on forming-cone assembly 71. It may then be rotated sufficiently that the lower extent (middle lip 73 in the illustrative embodiment) of assembly 71 rests on keys 95 and is thus elevated from its fully assembled condition. Keys 95 thus form a "cleaning seat" when assembly 71 is raised above them and rotated. This permits easier access to the bubble-diameter components for cleaning and inspection or repair or replacement, without complete disassembly/removal of forming-cone assembly 71 from main body 51.

The invention as described herein provides a number of advantages. Primarily, it eases and simplifies the disassembly of an air ring in terms of tools, equipment, and personnel required and reduces opportunities for error and damage to air ring components. The forming-cone assembly may be entirely disengaged and removed as a unit from the main body using only human strength or a lifting apparatus. It may be placed in the cleaning mode or configuration to ease access to the bubble-diameter components without fully disengaging the forming-cone assembly from the main body. The use of color-coded composite materials can simplify the replacement of parts.

The invention has been described with reference to a preferred and illustrative embodiment thereof. It is thus not limited, but is susceptible to variation and modification by those skilled in the art without departing from the scope and spirit of the invention.

We claim:

1. An air ring for use in a blown-film extrusion apparatus to form a polymer tube, the air ring comprising:
   a main body including a plenum through which pressurized air enters the air ring, the main body including a generally circular interior having at least one internal diametral dimension;
   a generally circular forming-cone assembly received in the generally circular interior of the main body, the forming-cone assembly including at least one annular passage in fluid communication at one end with the plenum of the main body, and terminating in an annular lip through which air exits the forming-cone assembly and impinges on the polymer tube, the forming-cone assembly having at least one external diametral dimension;
   an external flange on the forming-cone assembly that mates with a corresponding surface on the main body to support the forming-cone assembly within the interior of the main body, wherein all external diametral dimensions of the forming-cone assembly above the external flange are smaller than the internal diametral dimensions of the main body above the flange so that the flange is unobstructed from above; and
   a plurality of fasteners extending through the flange and removably securing the forming-cone assembly in the interior of the main body, wherein the fasteners are accessible from vertically above the air ring and the forming-cone assembly is removable from the main body by vertical lifting without removal of other components from the air ring.

2. The air ring according to claim 1, further comprising:
   a plurality of keys arranged about a circumference of one of the main body interior and the forming-cone assembly; and
   a plurality of keyways arranged about the circumference of another of the main body interior and the forming-cone assembly, wherein upon securing the forming-cone assembly in the interior, the keys and keyways register and locate the forming-cone assembly relative to the main body.

3. The air ring according to claim 1, wherein the forming-cone assembly further comprises:
   a second annular lip;
   a second passage at least partially defined in the forming-cone assembly through which pressurized air flows from the plenum and exits the second annular lip for impingement upon the polymer tube; and
   a supplementary lip.

4. The air ring according to claim 1, wherein the fasteners are tool-less and arranged to secure the keys in the keyways.

5. The air ring according to claim 1, wherein selected portions of the forming-cone assembly are formed of composite polymeric material.

6. The air ring according to claim 1, wherein at least one selected portion of the forming-cone assembly is color-coded to correspond with a functional characteristic of the selected portion of the forming-cone assembly.

7. An air ring for use in a blown-film extrusion apparatus to form a polymer tube, the air ring comprising:
   a main body including a plenum through which pressurized air enters the air ring, the main body including a generally circular interior that is unobstructed vertically above the main body;
   a generally circular forming-cone assembly received in the generally circular interior of the main body, the forming-cone assembly including at least one annular passage extending through the forming-cone assembly from the plenum to an annular lip through which pressurized air from the plenum exits the forming-cone assembly for impingement upon the polymer tube, the forming-cone assembly being unobstructed vertically above the air ring, wherein the forming-cone assembly is removable from the main body by vertical lifting without removal of other components from the air ring.

8. The air ring according to claim 7, further comprising:
   a plurality of fasteners securing the forming-cone assembly in the interior of the main body, wherein the fasteners are accessible from vertically above the air ring.

9. The air ring according to claim 7, further comprising:
   a plurality of keys arranged about a circumference of one of the main body interior and the forming-cone assembly; and
   a plurality of keyways arranged about the circumference of another of the main body interior and the forming-cone assembly, wherein upon securing the forming-cone assembly in the interior, the keys and keyways register and locate the forming-cone assembly relative to the main body.

10. The air ring according to claim 7, wherein the forming-cone assembly further comprises:
    a second annular lip;
    a second passage at least partially defined in the forming-cone assembly through which pressurized air flows from the plenum and exits the forming-cone assembly at the second annular lip for impingement upon the polymer tube; and
    a supplementary lip.

11. The air ring according to claim 8, wherein the fasteners are tool-less.

12. The air ring according to claim 7, wherein selected portions of the forming-cone assembly are formed of composite polymeric material.

13. The air ring according to claim 7, wherein at least one selected portion of the forming-cone assembly is color-coded to correspond with a functional characteristic of the selected portion of the forming-cone assembly.

14. The air ring according to claim 7, further comprising:

an external flange that mates with a corresponding surface on the main body and a plurality of fasteners extend through the flange to the corresponding surface on the main body.

15. The air ring according to claim 14, wherein the external flange has a diametral dimension that is smaller than any internal diametral dimension of the interior of the main body.

16. An air ring for use in a blown-film extrusion apparatus to form a polymer tube, the air ring comprising:

a main body including a plenum through which pressurized air enters the air ring, the main body including a generally circular interior;

a generally circular forming-cone assembly received in the generally circular interior of the main body, the forming-cone assembly including at least one annular passage in fluid communication at one end with the plenum of the main body, and terminating in an annular lip through which air exits the forming-cone assembly and impinges on the polymer tube;

an external flange on the forming-cone assembly that mates with a corresponding surface on the main body to support the forming-cone assembly within the interior of the main body, the external flange having an upper surface that is vertically unobstructed, wherein the forming-cone assembly is removable from the main body by vertical lifting without removal of other components from the air ring.

17. The air ring according to claim 16, further comprising:

a plurality of fasteners extending through the flange and removably securing the forming-cone assembly in the interior of the main body, wherein the fasteners are accessible from vertically above the air ring.

18. The air ring according to claim 16, further comprising:

a plurality of keys arranged about a circumference of one of the main body interior and the forming-cone assembly; and a plurality of keyways arranged about the circumference of another of the main body interior and the forming-cone assembly, wherein upon securing the forming-cone assembly in the interior, the keys and keyways register and locate the forming-cone assembly relative to the main body.

19. The air ring according to claim 16, wherein the forming-cone assembly further comprises:

a second annular lip;

a second passage at least partially defined in the forming-cone assembly through which pressurized air flows from the plenum and exits the second annular lip for impingement upon the polymer tube; and a supplementary lip.

20. The air ring according to claim 17, wherein the fasteners are tool-less and arranged to secure the keys in the keyways.

21. The air ring according to claim 16, wherein selected portions of the forming-cone assembly are formed of composite polymeric material.

22. The air ring according to claim 17, wherein at least one selected portion of the forming-cone assembly is color-coded to correspond with a functional characteristic of the selected portion of the forming-cone assembly.

23. The air ring according to claim 17, wherein:

the main body interior has a plurality of interior diametral dimensions;

the forming-cone assembly has a plurality of external diametral dimensions; and the external diametral dimensions of the forming-cone assembly above the flange are smaller than the internal diametral dimensions of the main body above the flange.

* * * * *